United States Patent
Yandle, III

[11] Patent Number: 5,152,314
[45] Date of Patent: Oct. 6, 1992

[54] SAFETY DEVICE FOR WATER DISPENSERS

[76] Inventor: Sylvester E. Yandle, III, 4642 Anson, New Orleans, La. 70131

[21] Appl. No.: 722,977

[22] Filed: Jun. 28, 1991

[51] Int. Cl.⁵ .............................................. F16K 35/00
[52] U.S. Cl. ..................................... 137/382; 222/182
[58] Field of Search ....................... 137/377, 382, 383; 220/85 P; 222/153, 182

[56] References Cited

U.S. PATENT DOCUMENTS

| | | | |
|---|---|---|---|
| 137,981 | 4/1873 | Varwig | 137/382 |
| 659,285 | 10/1900 | Boyle | 137/382 |
| 898,386 | 9/1908 | Nagle | 137/382 |
| 1,663,952 | 3/1928 | Peaden | 137/381 |
| 2,164,666 | 7/1939 | Simmons | 137/380 X |
| 2,735,590 | 2/1956 | Ayres | 137/382 X |
| 2,838,064 | 6/1958 | Schieberl | 137/382 |
| 3,410,303 | 11/1968 | Johnson | 137/381 |
| 3,623,498 | 11/1971 | Manahan | 137/382 X |
| 3,696,964 | 10/1972 | Deakin | 137/377 X |
| 3,770,168 | 11/1973 | Sagarin | 222/182 |
| 4,301,828 | 11/1981 | Martin | 137/381 |
| 4,307,748 | 12/1981 | Mathias | 137/381 |
| 4,408,631 | 10/1983 | Uhlig et al. | 137/380 |
| 4,576,315 | 3/1986 | Vitale | 222/182 X |
| 4,736,890 | 4/1988 | Wallington | 137/379 X |

FOREIGN PATENT DOCUMENTS 2138109  10/1984  United Kingdom .................. 222/153

Primary Examiner—Gerald A. Michalsky
Attorney, Agent, or Firm—Pravel, Gambrell, Hewitt, Kimball & Krieger

[57] ABSTRACT

A safety device (10) for a water dispenser (1) includes a safety tube (20), a cap (30), and an attachment strap (40) for attaching the safety tube (20) to the spigot (3) of the water dispenser (1). The dispensing button (4) is received in the interior (26) of the safety tube (20), with the wall (27) of the safty tube (20) surrounding the dispensing button (4) of the water dispenser (1). The cap (30) snaps onto a locking ridge (29) on the tube (20) to prevent access to the dispensing button (4) from above. When the cap (30) is properly fitted on the tube (20), the locking ridge (31) and the locking tab (32) on the safety cap (30) are received in the snap groove (28) of safety tube 20. When properly fitted on the spigot (3) of a water dispenser (1), the safety device (10) prevents small children from dispensing water from the water bottle (2) via the dispensing outlet (7) of the spigot (3). The cap (30) can be removed from the safety tube (20) only when the locking tab (32) of the cap (30) is aligned with the opening (60) in the locking ridge (29) on the tube (20).

18 Claims, 2 Drawing Sheets

SAFETY DEVICE FOR WATER DISPENSERS

BACKGROUND OF THE INVENTION

1. Field of the Invention

The present invention relates to water dispensers. More particularly, the present invention relates to a safety device for limiting access by children to water dispensers.

2. General Background of the Invention

Water dispensers are common today, as more people are becoming health-conscious and are wary of drinking the water which flows in the plumbing in their homes. Many of these health-conscious people have small children, and these small children like to play with the water dispensers. This child's play at best only wastes water (which is relatively expensive) and wets the floor around the water dispenser; much worse, it poses a safety hazard, as many water dispensers today have hot water spigots as well as cold, and the children can scald themselves when playing with this spigot.

SUMMARY OF THE INVENTION

The present invention is a safety device which protects children from being scalded by hot water in water dispensers, and also prevents small children from wasting water from a water dispenser. The invention comprises a safety tube (similar in appearance to a medicine bottle, and which could advantageously be made from the same materials as medicine bottles and having the same dimensions, with the additional features described below) which attaches securely to a spigot of a water dispenser, surrounding the dispensing button, the safety tube having a first, open end adjacent the supply pipe and finger grip of the spigot. A child-proof cap (similar to a child-proof cap of a child-proof medicine bottle, and which advantageously could be the same as a child-proof cap of a child-proof medicine bottle) is received on the second, open end of the safety tube (the end of the safety tube opposite the spigot), and is preferably permanently attached to the safety tube to prevent the cap from being lost or swallowed by a small child. The safety tube and the cap in combination prevent small children from pressing down on the dispensing button of the water dispenser.

When one desires to dispense water from the water dispenser, one removes the child-proof safety cap, and, one presses down on the dispensing button. After the desired amount of water is dispensed, the cap is again secured to the second, open end of the safety tube.

The present invention is advantageous in that, preventing access to the dispensing button by small children, water is not wasted by the children and the children are not scalded by hot water.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

PARTS LIST

Figure 7:
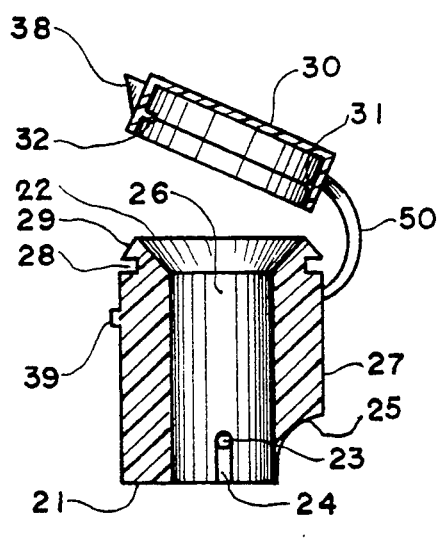
FIG. 7 is a view similar to FIG. 5, but showing the device of the present invention in section.
Figure 8:
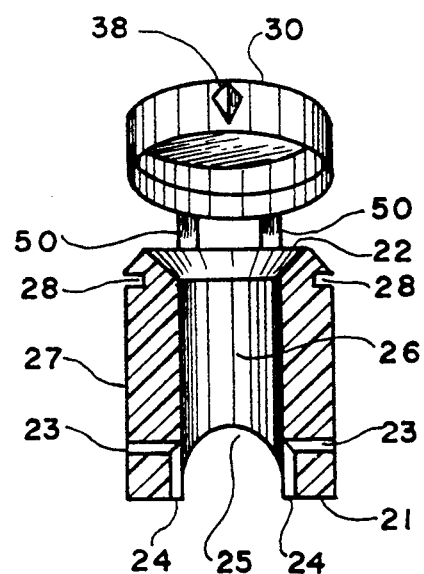
FIG. 8 is a view similar to FIG. 6, but showing the device of the present invention in section.

The following is a list of suitable parts and materials for the various elements of the preferred embodiment of the present invention.
1 water dispenser
2 water bottle
3 spigot of water dispenser 1
4 dispensing button of spigot 3
5 supply pipe of spigot 3
6 finger grip of spigot 3
7 dispensing outlet of spigot 3
10 safety device
20 safety tube
21 first, lower, open end of safety tube 20
22 second, upper, open end of safety tube 20
23 horizontal bore in safety tube 20
24 vertical bore in safety tube 20
25 arcuate opening in safety tube 20
26 interior of safety tube 20
27 wall of safety tube 20
28 snap groove of safety tube 20
29 locking ridge of safety tube 20
30 safety cap
31 locking ridge on safety cap 30 (see FIG. 7)
32 locking tab on safety cap 30 (see FIG. 7) (not as wide as opening 60)
38 thumb tab on cap 30
39 alignment arrow on tube 20
40 plastic strap for attaching safety tube 20 to spigot 3 (can be, e.g., electrical tie wrap)
50 plastic straps attaching cap 30 to tube 20
60 opening in locking ridge 29

DETAILED DESCRIPTION OF THE PREFERRED EMBODIMENT

Figure 1:
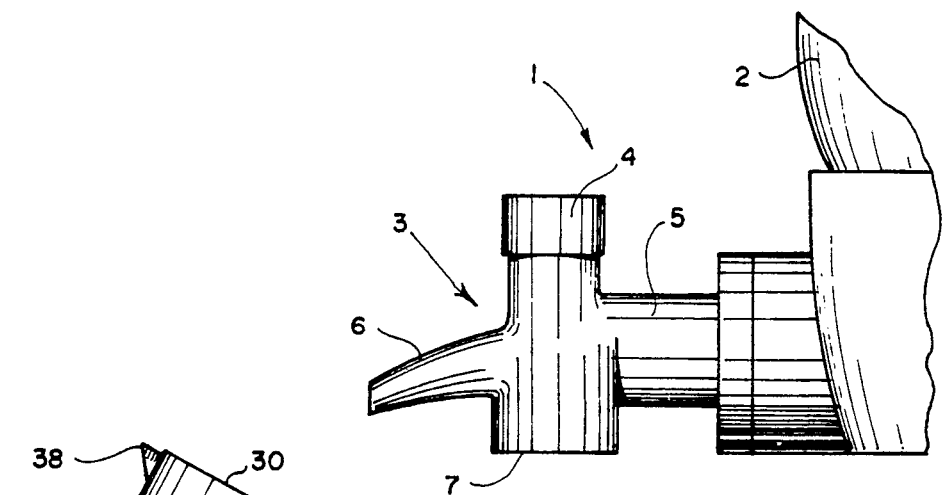
FIG. 1 is an side partial view of a water dispenser.
Figure 2:
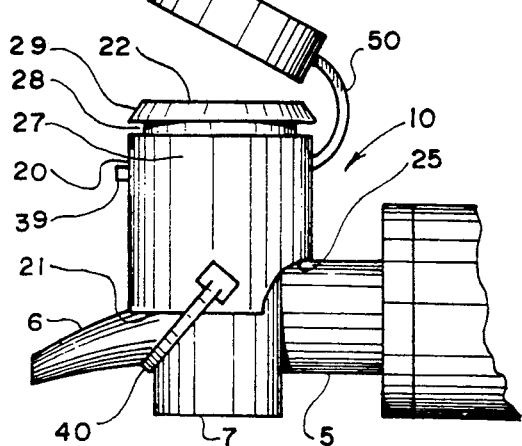
FIG. 2 is a side view of the spigot of the water dispenser of FIG. 1 with the device of the preferred embodiment of the present invention attached thereto.
Figure 3:
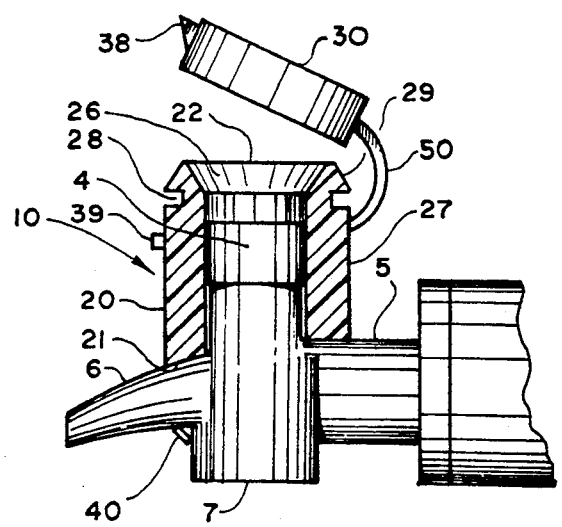
FIG. 3 is a view similar to FIG. 2, but showing the device of the present invention in section.
Figure 4:
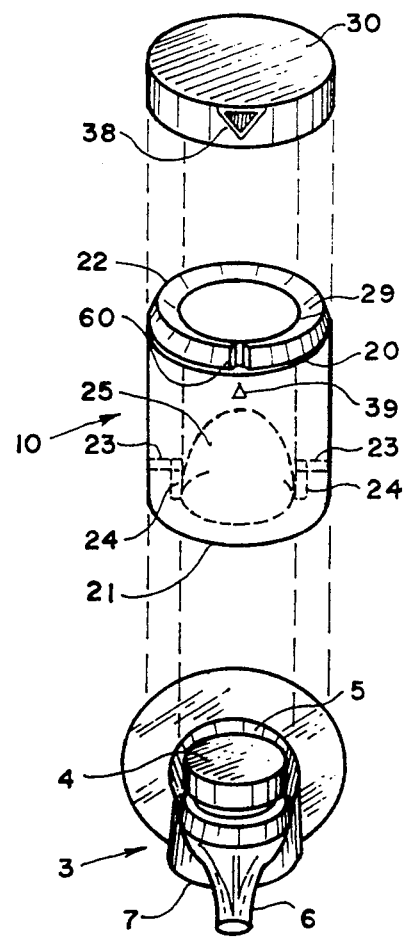
FIG. 4 is an exploded view of the device of the present invention, shown without straps 40 and 50.
Figure 5:
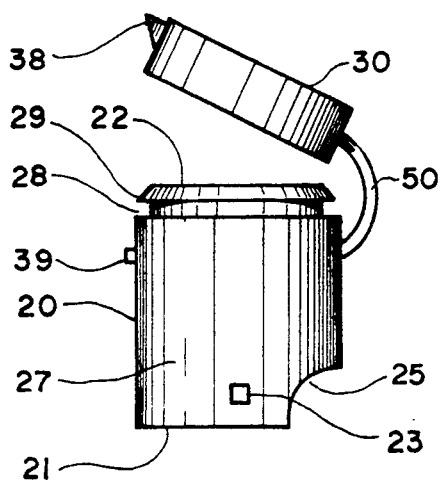
FIG. 5 is a side view of the device of the preferred embodiment of the present invention, with strap 40 omitted.
Figure 6:
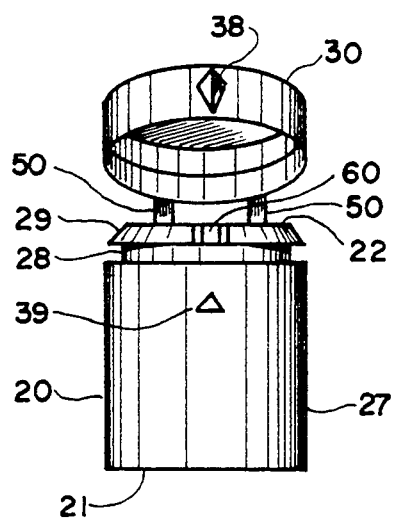
FIG. 6 is a front view of the device shown in FIG. 5.

FIG. 1 shows a water dispenser I of the type in common use today, including a water bottle 2 which feeds water into a spigot 3 via a supply pipe 5. Spigot 3 includes a dispensing button 4, a finger grip 6, and a dispensing outlet 7. Water is dispensed from outlet 7 when there is water in water bottle 2 and dispensing button 4 is depressed. Many water dispensers have two spigots 3, one for dispensing hot water and the other for dispensing cold. The present invention can be used on both spigots.

FIGS. 2 through 8 illustrate the preferred embodiment of the present invention, safety device 10.

Safety device 10 for a water dispenser includes a safety tube 20, a cap 30, and an attachment strap 40 for attaching safety tube 20 to the spigot 3 of water dispenser 1. Safety tube 20 receives dispensing button 4 in the interior 26 of safety tube 20, with wall 27 of safety tube 20 surrounding dispensing button 4 of water dispenser 1.

Cap 30 snaps onto a locking ridge 29 on tube 20 to prevent access to dispensing button 4 from above.

The first, lower, open end 21 of safety tube 20 is in contact with supply pipe 5 of water dispenser and the second, upper, open end 22 of safety tube 20 receives cap 30. There are horizontal bores 23 and vertical bores 24 in safety tube 20 for receiving strap 40 which straps safety tube 20 to spigot 3 by securing it to finger grip 6 of spigot 3.

There is an arcuate opening 25, shaped to conform to supply pipe 5 of spigot 3, in safety tube 20 to allow tube 20 to fit snugly in contact with finger grip 6 without interference from supply pipe 5.

Optional plastic straps 50 attach cap 30 to tube 20.

When cap 30 is secured to tube 20, cap 30 is snapped onto locking ridge 29 such that locking ridge 31 on safety cap 30 (see FIG. 7) is received in snap groove 28 of safety tube 20. Locking tab 32 on safety cap 30 (see FIG. 7) and locking ridge 31 (which, incidentally, need not be continuous, but merely needs to be longer than opening 60 is wide) normally prevent the removal of cap 30 from tube 20 in the same manner as locking tabs and ridges on safety caps of medicine bottles prevent removal of the caps from the bottles; that is, the upper exterior surface of locking ridge 29 is at approximately a 30 degree angle with vertical, while the lower exterior surface of locking ridge 29 is at 90 degrees with vertical, the angled upper surface allowing cap 30 to deform slightly when cap 30 is pressed down on tube 20, but the 90 degree lower surface providing an effective lock to prevent cap 30 from being removed. When locking tab 32 (see FIG. 7) of cap 30 is aligned with opening 60 in locking ridge 29 (which occurs when thumb tab 38 on cap 30 is lined up with alignment arrow 39 on tube 20), cap 30 can easily be removed by pushing upwardly on thumb tab 38 of cap 30 (locking tab 32 is not as wide as opening 60 to allow tab 32 to fit through opening 60).

When it is desired to child-proof a water dispenser, one puts a safety device 10 on each spigot 3, with the first, lower, open end 21 of safety tube 20 in contact with finger grip 6 and supply pipe 5 of spigot 3. Safety device 10 is attached to spigot 3 by aligning safety tube 20 such that arcuate opening 25 in tube 20 is aligned with supply pipe 5 of spigot 3. Plastic strap 40 is then threaded through bores 23 and 24 and the two ends of strap 40 are tied together. Cap 30 is then snapped down into place on tube 20 such that locking ridge 31 and locking tab 32 of safety cap 30 are snapped over locking ridge 29 of tube 20 and are received in locking groove 28 of tube 20.

When it is desired to dispense water from bottle 2, thumb tab 38 of cap 30 is lined up with arrow 39 on tube 20, thus aligning locking tab 32 with opening 60 in locking ridge 29. Thumb tab 38 is then pushed up (preferably when small children are not observing), and cap 30 is removed from the second, upper, open end 22 of tube 20. Plastic straps 50 prevent cap 30 from getting lost or being swallowed by a small child. Dispensing button 4 can then be depressed, and water can flow from dispensing outlet 7 of spigot 3.

When one is through dispensing water from spigot 3, cap 30 is snapped back into place on the second, open end of tube 20, thereby preventing access by small children to dispensing button 4.

Safety device 10 is preferably made of plastic. Safety tube 20 can advantageously be made of clear acrylic, and safety cap 30 can advantageously be made of opaque plastic. Safety cap 30 could, for example, comprise a Lermer brand 7 dram child-proof medicine cap when dispenser 1 is an Ebco (Oasis) brand water dispenser.

Exemplary dimensions for safety tube 20 are:
outside diameter—1.100 inches;
inside diameter—0.775 inches;
outside diameter of locking ridge 29—1.000 inches;
distance from bottom of snap groove 28 to second, upper end 22 of safety tube 20—0.100 inches;
diameter of horizontal bore 23—0.125 inches;
diameter of vertical bore 24—0.125 inches;
distance from first, open end 21 to second, open end 22 1.300 inches; and
distance from the upper part of arcuate opening 25 to second, upper end 22—1.005 inches.

Exemplary dimensions for safety cap 30 are:
outer diameter—1.300 inches; inner diameter of locking ridge 31—0.960 inches; and distance from the upper surface of cap 30 to the lower surface thereof—0.200 inches.

Although cap 30 is shown as having locking tab 32, cap 30 could comprise any effective child-proof cap used on child-proof medicine bottles.

As discussed above, the present invention can help prevent small children from being scalded by hot water, can help save bottled water, and can help keep the floor around water dispensers in homes with small children dry.

The foregoing embodiments are presented by way of example only; the scope of the present invention is to be limited only by the following claims.

I claim:

1. A safety device for water dispensers having a spigot and a dispensing button, the device comprising:
   (a) a tube means for surrounding the dispensing button, the tube means having a first open end for contacting the spigot and a second, open end;
   (b) attachment means for attaching the tube means to the spigot, such that the first open end is contacting the spigot;
   (c) a child-proof cap means receivable on the second open end of the tube means for closing the second, open end of the tube means for preventing access to the dispensing button when the tube means is attached to the spigot and surrounding the dispensing button, wherein:
   the spigot includes a finger grip, and the attachment means for attaching the tube means to the spigot includes a strap means which passes from the tube means, around the finger grip, back to the tube means.

2. The safety device of claim 1, wherein:
the tube means is substantially cylindrical.

3. The safety device of claim 2, wherein:
the cap means comprises a safety cap for medicine bottles.

4. The safety device of claim 1, further comprising:
permanent attachment means for permanently attaching the cap means to the tube means to prevent the cap means from getting lost when not secured to the second open end of the tube means.

5. The safety device of claim 4, wherein:
the permanent attachment means for permanently attaching the cap means to the tube means comprises a plastic strap.

6. The safety device of claim 1, wherein:
the tube means is attached to the spigot with a plastic strap.

7. The safety device of claim 6, wherein:
the tube means includes holes therein to allow the plastic strap to pass therethrough.

8. The safety device of claim 1, wherein the spigot includes a supply pipe, and the device further comprises:
a generally arcuate cut in the first open end of the tube means for conforming to the supply pipe of the spigot.

9. The safety device of claim 1, further comprising:
means for preventing the cap mans from being removed from the second open end of the tube means except when the cap means is oriented in a predetermined manner in relation to the tube means.

10. A safety device for water dispensers having a spigot and a dispensing button, the device comprising:
(a) a tube for surrounding the dispensing button, the tube having a first open end for contacting the spigot and a second, open end;
(b) an attachment device for attaching the tube to the spigot, such that the first open end is contacting the spigot;
(c) a cap receivable on the second open end of the tube for closing the second, open end of the tube for preventing access to the dispensing button when the tube is attached to the spigot and surrounding the dispensing button, wherein:
the spigot includes a finger grip, and the attachment device for attaching the tube to the spigot includes a strap which passes from the tube, around the finger grip, back to the tube.

11. The safety device of claim 10, wherein:
the tube is substantially cylindrical.

12. The safety device of claim 11, wherein:
the cap comprises a safety cap for medicine bottles.

13. The safety device of claim 10, further comprising:
a permanent attachment device for permanently attaching the cap to the tube to prevent the cap from getting lost when not secured to the second open end of the tube.

14. The safety device of claim 13, wherein:
the permanent attachment device comprises a plastic strap.

15. The safety device of claim 10, wherein:
the tube is attached to the spigot with a plastic strap.

16. The safety device of claim 15, wherein:
the tube includes holes therein to allow the plastic strap to pass therethrough.

17. The safety device of claim 10, wherein the spigot includes a supply pipe, and the device further comprises:
a generally arcuate cut in the first open end of the tube for conforming to the supply pipe of the spigot.

18. The safety device of claim 10, further comprising:
a device for preventing the cap from being removed from the second open end of the tube except when the cap is oriented in a predetermined manner in relation to the tube.

* * * * *